US012304226B2

(12) United States Patent
Asada et al.

(10) Patent No.: US 12,304,226 B2
(45) Date of Patent: May 20, 2025

(54) HEAD UNIT POSITION ADJUSTMENT METHOD

(71) Applicant: SCREEN HOLDINGS CO., LTD., Kyoto (JP)

(72) Inventors: Kazuhiko Asada, Kyoto (JP); Shinsuke Yamashita, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 98 days.

(21) Appl. No.: 18/457,653

(22) Filed: Aug. 29, 2023

(65) Prior Publication Data

US 2024/0083184 A1 Mar. 14, 2024

(30) Foreign Application Priority Data

Sep. 14, 2022 (JP) ................................. 2022-145759

(51) Int. Cl.
*B41J 25/308* (2006.01)

(52) U.S. Cl.
CPC .................................. *B41J 25/308* (2013.01)

(58) Field of Classification Search
CPC ...................................................... B41J 25/308
See application file for complete search history.

(56) References Cited

U.S. PATENT DOCUMENTS

2014/0259595 A1 9/2014 Von Essen et al.
2017/0165987 A1 6/2017 Hamano
2021/0162784 A1* 6/2021 Tsubaki ................ B41J 25/003

FOREIGN PATENT DOCUMENTS

EP 2913188 B1 * 7/2021 ............. B41J 2/155
GB 2483473 A * 3/2012 .......... B41J 11/0015
JP 2008-062583 A 3/2008
JP 2012-161992 A 8/2012
JP 6524173 B2 6/2019

OTHER PUBLICATIONS

Hudd, MachineTranslationofGB-2483473-A,2012 (Year: 2012).*
Ueda, MachineTranslationofEP-2913188-B1,2021 (Year: 2021).*
Extended European Search Report received in EP Application No. 23194273.1, dated Feb. 16, 2024.

* cited by examiner

*Primary Examiner* — Scott A Richmond
(74) *Attorney, Agent, or Firm* — Rimon P.C.

(57) ABSTRACT

The present invention is a position adjustment method for head units arrayed in a predetermined width direction attachably to and detachably from a base member. A position of a second head unit in the width direction and a rotation direction are respectively adjusted while the second head unit is engaging a tip part of a reference pin. More particularly, a width direction adjuster moves the second head unit in the width direction with a first head unit kept fixed to the base member. In this way, the gap between the first head unit and the second head unit is adjusted. Further, a rotation direction adjuster moves the second head unit in the orthogonal direction at a separation position distant from the reference pin. In this way, a rotation direction position of the second head unit with respect to the tip part of the reference pin is adjusted.

6 Claims, 9 Drawing Sheets

HEAD UNIT POSITION ADJUSTMENT METHOD

CROSS REFERENCE TO RELATED APPLICATION

The disclosure of Japanese Patent Application No. 2022-145759 filed on Sep. 14, 2022 including specification, drawings and claims is incorporated herein by reference in its entirety.

BACKGROUND OF THE INVENTION

1. Field of the Invention

This invention relates to a position adjustment method for head units arrayed in a predetermined width direction attachably to and detachably from a base member.

2. Description of the Related Art

A printing apparatus is known which prints an image on the upper surface of a printing medium by discharging a water-based or oil-based ink from nozzle surfaces of an ink discharge head to the printing medium in an ink-jet method. In this printing apparatus, a plurality of fluid discharge modules are arrayed in a predetermined direction and attached to a frame (corresponding to a "base member" of the invention of this application), for example, as described in Japanese Patent No. 6524173. More particularly, a module mount assembly (corresponding to an "ink discharge head" of the invention of this application) is formed by joining the fluid discharge modules to a module mount. In this way, a plurality of module mount assemblies are prepared in this way. On the other hand, a plurality of clamp assemblies are mounted on the frame and the clamp assemblies are aligned using an alignment jig. The module mount assemblies are attached one-to-one to the clamp assemblies.

SUMMARY OF INVENTION

In the above conventional technique, the plurality of module mount assemblies are aligned with each other by aligning the clamp assemblies. However, in the apparatus of Japanese Patent No. 6524173, the position of each module mount assembly is adjusted, utilizing a biasing force of a spring built-in the clamp assembly. However, there is a limit to adjustment precision in this adjustment method. Further, the module mount assemblies may be misaligned due to the action of an external force on nozzle surfaces during head cleaning. Due to these, discharge performances such as a discharge direction and a discharge position become uneven for each nozzle surface, with the result that there has been a problem that sufficient printing quality cannot be obtained.

This invention was developed in view of the above problem and aims to provide a head unit position adjustment method capable of adjusting the position of a second head unit attached adjacent in a width direction to a first head unit fixed to a base member with respect to the first head unit with high precision.

An invention is a head unit position adjustment method for adjusting a position of a second head unit attached adjacent in a width direction to a first head unit fixed to a base member. The method comprises: (a) temporarily attaching the second head unit in an attachment region adjacent to the first head unit in the width direction; (b) causing a tip part of a reference pin to stand in a surface normal direction of the base member with respect to the base member by mounting a base end part of the reference pin into a reference pin hole provided adjacent to the attachment region in the base member; (c) mounting an adjustment jig on the base member, the adjustment jig being configured to support the second head unit movably in the width direction and rotatably about the tip part of the reference pin as a center of rotation while engaging the tip part of the reference pin; (d) inserting a width direction adjuster between the first head unit and the second head unit and inserting a rotation direction adjuster between the second head unit and the adjustment jig at a separation position distant from the reference pin in the width direction; (e) adjusting a gap between the first head unit and the second head unit in the width direction by moving the second head unit in the width direction by the width direction adjuster with the temporary attachment of the second head unit loosened and adjusting a rotation direction position of the second head unit with respect to the tip part of the reference pin by moving the second head unit in an orthogonal direction orthogonal to both the width direction and the surface normal direction at the separation position by the rotation direction adjuster; and (f) fastening and completely attaching the second head unit to the base member after the completion of the operation (e).

In the invention thus configured, the positions of the second head unit in the width direction and the rotation direction are respectively adjusted while the second head unit is engaging the tip part of the reference pin. More particularly, the width direction adjuster moves the second head unit in the width direction with the first head unit kept fixed to the base member. In this way, the gap between the first head unit and the second head unit is adjusted. Further, the rotation direction adjuster moves the second head unit in the orthogonal direction at the separation position distant from the reference pin. In this way, the rotation direction position of the second head unit with respect to the tip part of the reference pin is adjusted.

As described above, according to the invention, the position of the second head unit with respect to the first head unit can be adjusted with high precision.

All of a plurality of constituent elements of each aspect of the invention described above are not essential and some of the plurality of constituent elements can be appropriately changed, deleted, replaced by other new constituent elements or have limited contents partially deleted in order to solve some or all of the aforementioned problems or to achieve some or all of effects described in this specification. Further, some or all of technical features included in one aspect of the invention described above can be combined with some or all of technical features included in another aspect of the invention described above to obtain one independent form of the invention in order to solve some or all of the aforementioned problems or to achieve some or all of the effects described in this specification.

DETAILED DESCRIPTION OF THE PREFERRED EMBODIMENTS

Figure 1:
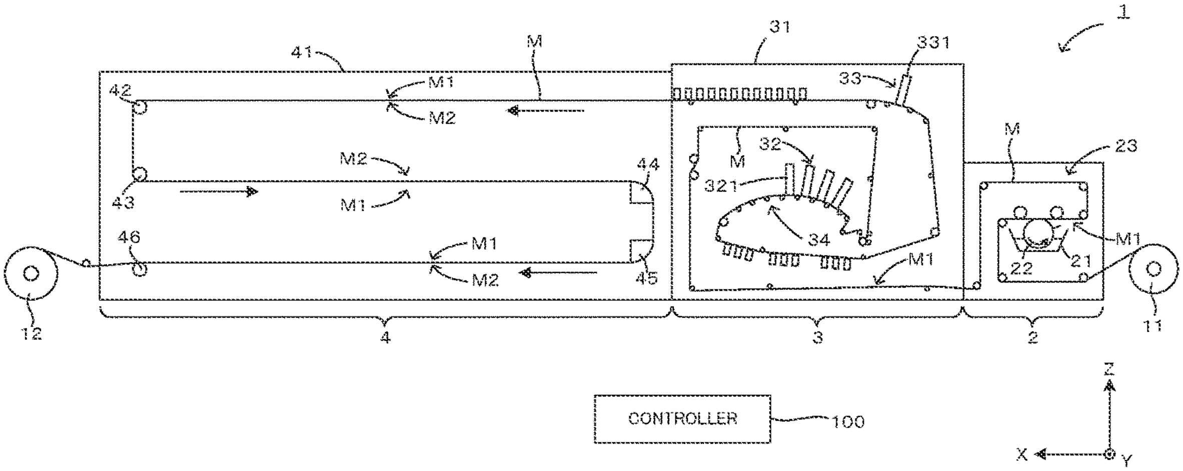
FIG. 1 is a front view schematically showing an example of a printing system equipped with a head unit to which one embodiment of a printing apparatus according to the invention.

FIG. 1 is a front view schematically showing an example of a printing system equipped with a head unit to which one embodiment of a printing apparatus according to the invention. In FIG. 1 and subsequent figures, a horizontal direction in which a coating apparatus 2, a printing apparatus 3 and a drying apparatus 4 constituting a printing system 1 are arranged is referred to as an "X direction", a horizontal direction from a right side toward a left side of FIG. 1 is referred to as a "+X direction" and an opposite direction is referred to as a "−X direction" to clarify an arrangement relationship of each component of the apparatus. Further, out of horizontal directions Y orthogonal to the X direction, a direction forward of the apparatuses is referred to as a "+Y direction" and a direction backward of the apparatuses is referred to as a "−Y direction". Further, upward and downward directions along a vertical direction Z are respectively referred to as a "+Z direction" and a "−Z direction".

This printing system 1 applies a coating process, a printing process and a drying process to a printing medium M while conveying the printing medium M in the form of a long strip from a feeding roll 11 to a winding roll 12 in a roll-to-roll manner by controlling each component of the apparatuses by a controller 100. That is, the coating apparatus 2 applies a coating liquid to the printing medium M. Then, the printing apparatus 3 prints an image by causing various inks to adhere to the printing medium M in an ink-jet method. Further, the drying apparatus 4 dries the inks adhering to the printing medium M. Note that a material of the printing medium M is a film made of OPP (oriented polypropylene), PET (polyethylene terephthalate) or the like. However, the material of the printing medium M is not limited to the film and may be paper or the like. Such a printing medium M is flexible. Further, out of both surfaces of the printing medium M, the surface on which images are to be printed is referred to as a front surface M1 and the surface opposite to the front surface M1 is referred to as a back surface M2 as appropriate.

The coating apparatus 2 includes a pan 21 storing a liquid primer (coating liquid), a gravure roller 22 partially immersed in the primer stored in the pan 21 and a conveying unit 23 conveying the printing medium M. In the coating apparatus 2, a coating region is provided where the gravure roller 22 contacts the printing medium M conveyed by the conveying unit 23 from below, and the conveying unit 23 conveys the printing medium M along the coating region with the front surface M1 of the printing medium M facing down. On the other hand, the gravure roller 22 supplies the primer to the coating region by rotating while holding the primer on the peripheral surface thereof. In this way, the primer supplied by the gravure roller 22 is applied to the front surface M1 of the printing medium M in the coating region. Further, in the coating region, a moving direction of the printing medium M and a rotating direction of the peripheral surface of the gravure roller 22 are opposite. That is, the primer is applied to the printing medium M by a reverse kiss method. Then, the conveying unit 23 carries out the printing medium M from the coating apparatus 2 to the printing apparatus 3 with the front surface M1 of the printing medium M having the primer applied thereto facing up.

The printing apparatus 3 includes a housing 31, a color printing unit 32 arranged in the housing 31, a white printing unit 33 arranged above the color printing unit 32 in the housing 31, and a conveying unit 34 conveying the printing medium M by a plurality of rollers arranged in the housing 31.

The color printing unit 32 includes a plurality of (four) printing bar units 321 arrayed in the moving direction (direction from the other side X2 toward the one side X1) of the printing medium M above the printing medium M conveyed by the conveying unit 34. The plurality of printing bar units 321 include nozzles facing the front surface M1 of the printing medium M passing therebelow from above, and discharge color inks of mutually different colors from the nozzles by the ink-jet method. Here, the color inks mean inks other than a white ink and include inks of cyan, magenta, yellow, black and the like. In this way, the plurality of printing bar units 321 of the color printing unit 32 print a color image on the front surface M1 of the printing medium M by discharging the color inks to the front surface M1 of the printing medium M passing therebelow from above.

Further, the white printing unit 33 includes a single printing bar unit 331 arranged above the printing medium M conveyed by the conveying unit 34. The printing bar unit 331 includes nozzles facing the front surface M1 of the printing medium M passing therebelow and discharges a white ink from the nozzles by an inkjet method. In this way, the printing bar unit 331 of the white printing unit 33 prints a white image on the front surface M1 of the printing medium M by discharging the white ink to the front surface M1 of the printing medium M passing therebelow from above.

The printing bar unit 321, 331 is constituted by a plurality of ink discharge heads for discharging inks from nozzle surfaces in the ink-jet method. In this embodiment, ten ink discharge heads are arranged in a width direction of the printing medium M. A detailed configuration of the printing bar unit 321, 331, the adjustment and exchange of each ink discharge head and the like are described in detail later.

Note that, although not shown in FIG. 1, two types of dryers are provided in the housing 31 of the printing apparatus 3. One dryer is a pre-dryer for drying the color inks adhered to the surface M1 of the printing medium M by the color printing unit 32. The other dryer is an upper dryer for drying the white ink adhered to the surface M1 of the printing medium M by the white printing unit 33.

The drying apparatus 4 dries the inks adhering to the surface M1 of the printing medium M being conveyed from the printing apparatus 3. The drying apparatus 4 includes a housing 41 (drying furnace). Further, in the housing 41, rollers 42, 43 and 46 are arranged on a (+X) side and air turn bars 44, 45 are arranged on a (−X) side. By this arrangement, a substantially S-shaped conveyance path when viewed from a (+Y) side is configured, and the printing medium M is conveyed along this conveyance path. The inks adhering to the surface M1 of the printing medium M are dried during this conveyance. Then, the printing medium M subjected to the drying process is carried out from the drying apparatus 4 and wound on the winding roll 12.

Figure 2:
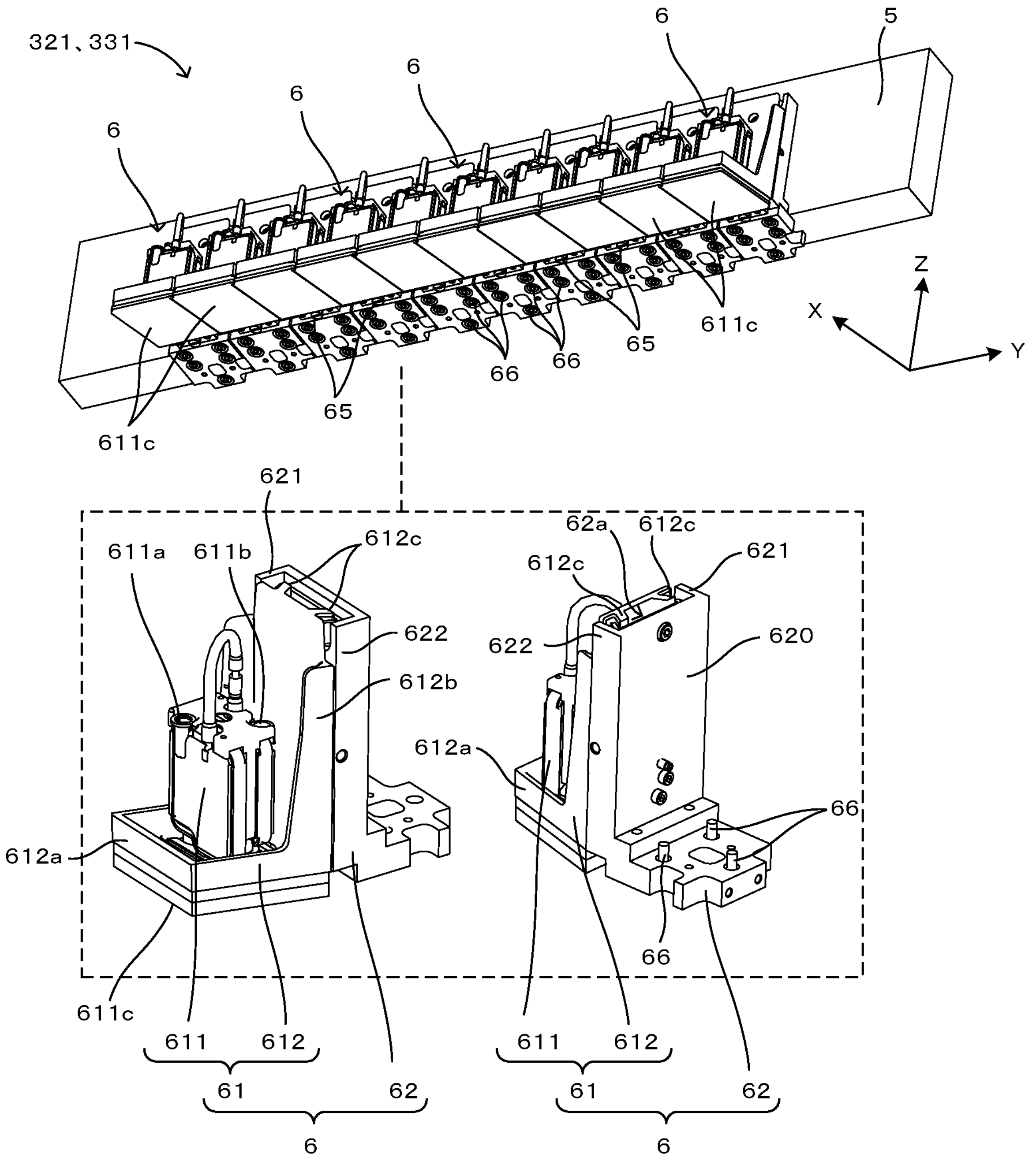
FIG. 2 is a perspective view showing a main part of the printing bar unit.

FIG. 2 is a perspective view showing a main part of the printing bar unit. In the printing bar unit 321, 331, ten head units 6 are adjacently attached in the width direction Y to a base member 5 extending in the width direction Y. Each head unit 6 is such that an ink discharge head 61 is held by a head holder 62 and fixed by fixing screws 65.

Incidentally, if one of the head units 6 constituting the printing bar unit 321, 331 breaks down and needs to be exchanged in the printing bar unit 321, 331 configured as described above, the broken-down head unit 6 is removed from a head unit row arrayed in the width direction Y. Further, a new head unit 6 is attached in an attachment region, which became empty by this removal. During this attachment, the new head unit 6 needs to be adjusted with high precision. Accordingly, in this embodiment, the position of the new head unit 6 is adjusted as follows. Note that, to facilitate the understanding of contents of the invention, the head unit 6 adjacent to the empty attachment region (51 in FIG. 3) and kept fixed to the base member 5 is referred to as the head unit 6*a*, the head unit 6 to be removed is referred to as the head unit 6*b*, and the head unit 6 to be newly attached in the empty attachment region is referred to as the head unit 6*c* as appropriate.

Figure 3:
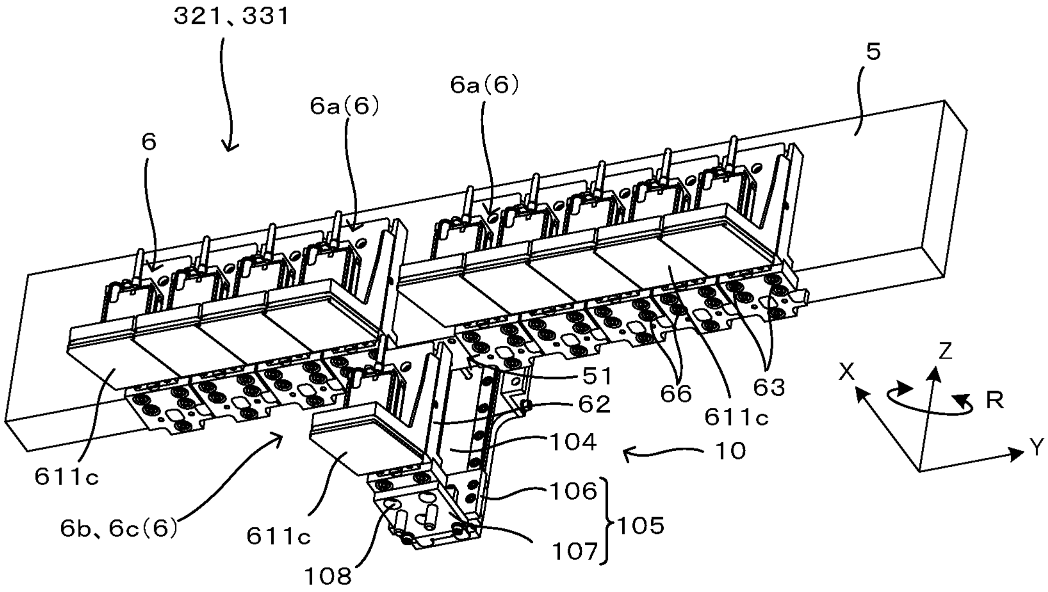
FIG. 3 is a perspective view showing an attaching/detaching operation of the head unit to and from the base member.
Figure 4:
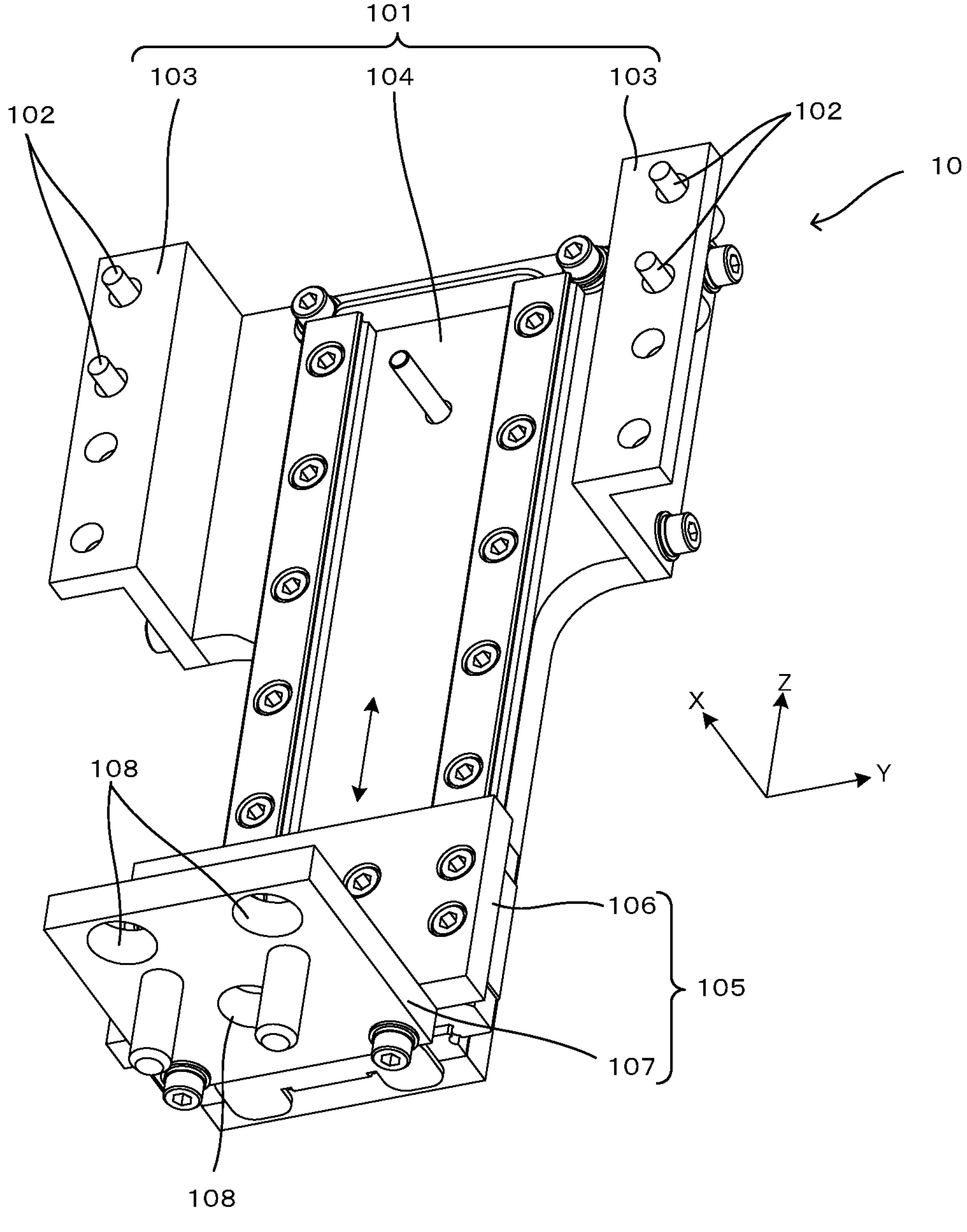
FIG. 4 is a perspective view showing an example of an attachment/detachment jig used at the time of attaching and detaching the head unit.

FIG. 3 is a perspective view showing an attaching/detaching operation of the head unit to and from the base member, and FIG. 4 is a perspective view showing an example of an attachment/detachment jig used at the time of attaching and detaching the head unit. An attachment/detachment jig 10 is a jig for attaching and detaching the head unit 6 to and from the base member 5 for each head unit. As shown in FIG. 4, the attachment/detachment jig includes a jig body part 101 attachable to and detachable from the base member 5. The jig body part 101 includes a pair of attachment members 103 to be attached to the base member 5 by fastening fittings 102 such as bolts and a guide member 104 extending in a sliding direction Z orthogonal to the width direction Y. The attachment members 103 are attached to the base member 5 to correspond to an attachment planed position where the head unit 6 is attached to the base member 5, for example, as shown in FIG. 3. By this attachment, the guide member 104 extends downward of the base member 5. A slider 105 capable of supporting the head unit 6 is attached to the guide member 104 movably in the sliding direction Z. Thus, by moving the slider 105 upward (+Z) with the head unit 6*b* (6*c*) supported on the slider 105, this head unit 6*b* (6*c*) can be easily and precisely located at a desired position of the base member 5. Here, if a width of the slider 105 is set equal to or smaller than that of the head unit 6 in the width direction Y, the interference of the slider 105 with the head unit 6 attached to the base member 5 can be effectively prevented. For example, as shown in FIG. 3, the slider 105 supporting the head unit 6*b* (6*c*) is easily inserted between the head units 6*a*, 6*a* or removed from between the head units 6*a*, 6*a* without interfering with the head units 6*a*, 6*a* adjacent to the head unit 6*b* (6*c*) on the base member 5.

Accordingly, in this embodiment, the attachment/detachment jig 10 shown in FIG. 4 is used in attaching and detaching the head unit. For example, as shown in FIG. 3, the head unit 6*b* between the head units 6*a* and 6*a* is smoothly removed by performing the following operation procedure. That is, a removing operation includes:

Mounting the attachment members 103 of the attachment/detachment jig 10 on the base member 5 by the fastening fittings 102 at a position corresponding to the head unit 6*b;*

Moving the empty slider 105 upward to the above position and supporting the head unit 6*b* by the slider 105;

Releasing the fixing of the head unit 6 by fastening fittings 66;

Lowering the slider 105 and the head unit 6 integrally to a lowermost position (separation position) of the guide member 104 (see FIG. 3), and Removing the head unit 6 from the slider 105.

On the other hand, the new head unit 6*c* is smoothly attached in the emptied attachment region 51 on the surface of the base member 5 by performing the following operation procedure. That is, an attaching operation includes:

Mounting the attachment members 103 of the attachment/detachment jig 10 on the base member 5 by the fastening fittings 102 at a position corresponding to the emptied attachment region 51;

Lowering the empty slider 105 to the lowermost position (separation position) of the guide member 104;

Mounting the head unit 6*c* on the slider 105 at the lowermost position;

Moving the slider 105 and the head unit 6*c* integrally upward to the attachment region 51; and Releasing the support of the head unit 6*c* by the slider 105 after the head unit 6*c* is attached to the attachment region 51 of the base member 5.

In this way, the head unit 6*c* is attached to the attachment region 51. To ensure high printing quality, the position of the newly attached head unit 6*c* needs to be adjusted with high precision so that a relative positional relationship of the head unit 6*c* with respect to the head units 6*a* fixed to the base member 5 is as designed. Accordingly, in this embodiment, a head unit position adjustment described next is performed.

Figure 5:
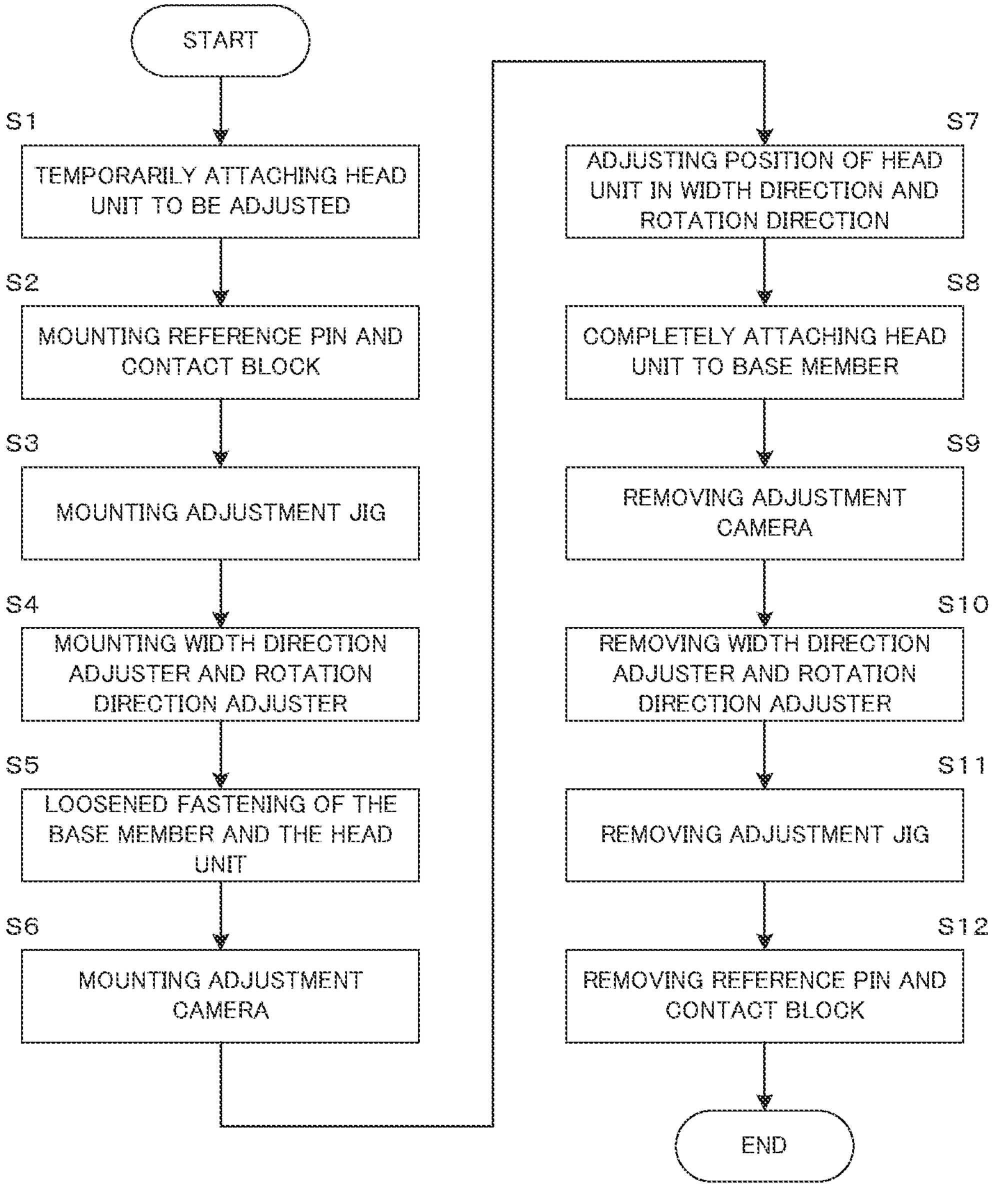
FIG. 5 is a flow chart showing one embodiment of a head unit position adjustment method according to the invention.
Figure 6:
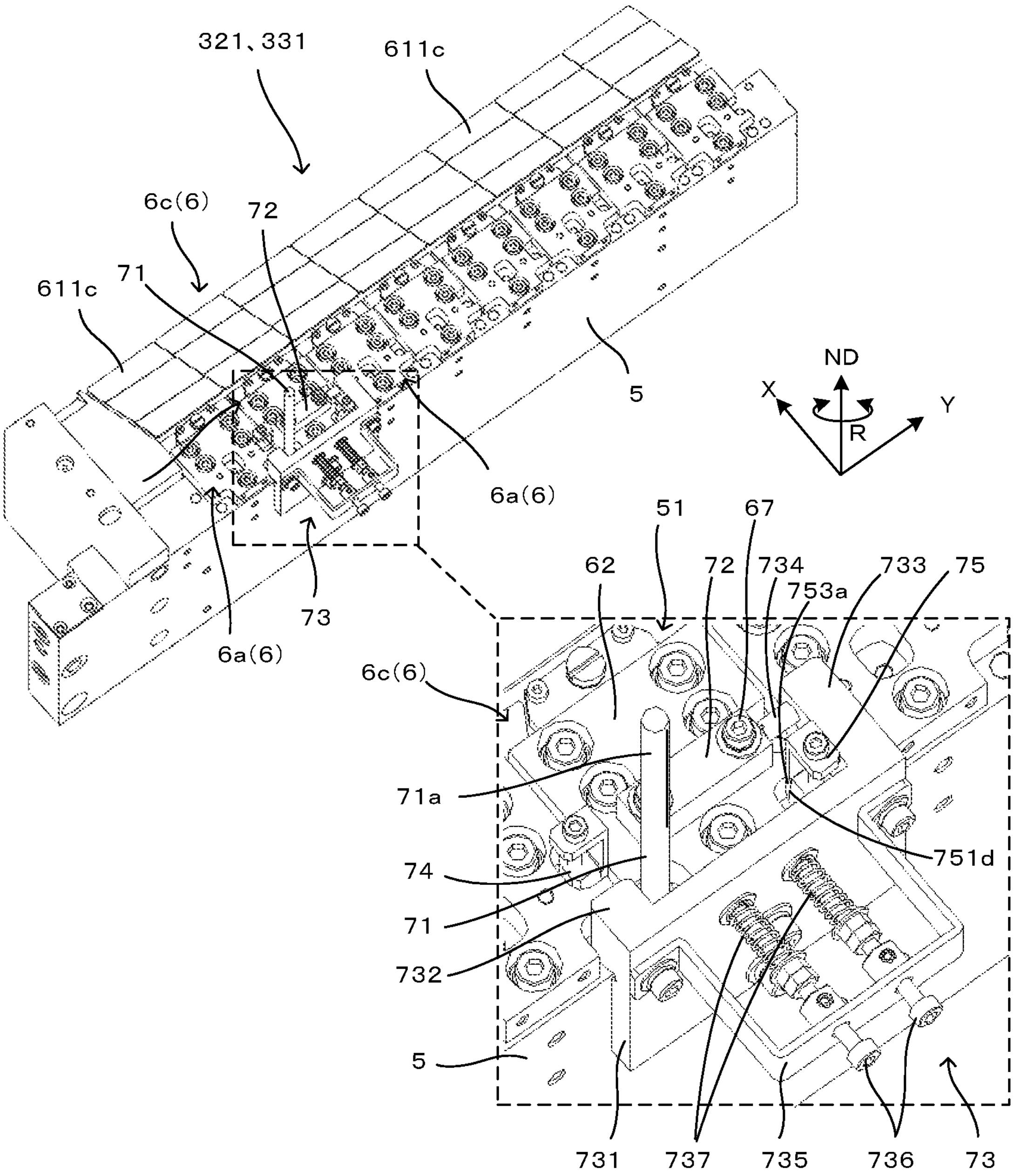
FIG. 6 is a perspective view showing a mounting structure of an adjustment jig, a width direction adjuster, a rotation direction adjuster, a reference pin and a contact block used in the position adjustment method shown in FIG. 5.

FIG. 5 is a flow chart showing one embodiment of a head unit position adjustment method according to the invention. FIG. 6 is a perspective view showing a mounting structure of an adjustment jig, a width direction adjuster, a rotation direction adjuster, a reference pin and a contact block used in the position adjustment method shown in FIG. 5. FIGS. 7A to 7D are diagrams schematically showing a head unit position adjustment procedure. In this embodiment, an operator adjusts a width direction position of the head unit 6*c* in a width direction Y and a rotation direction position of the head unit 6*c* in a rotation direction R about a reference pin 71 as a center of rotation in the procedure shown in FIG. 5.

Figure 7A:
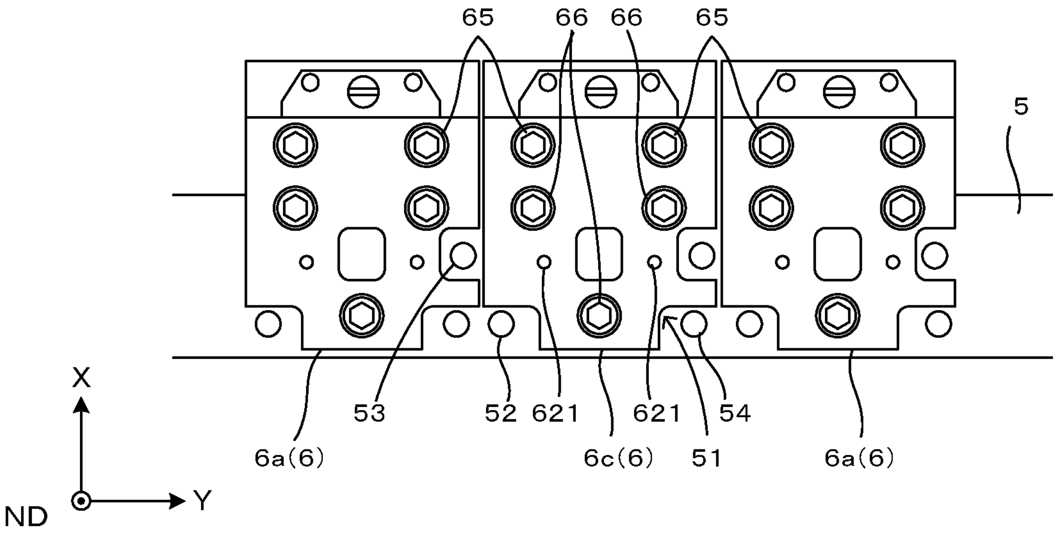
FIGS. 7A to 7D are diagrams schematically showing a head unit position adjustment procedure.

The operator attaches the new head unit 6*c* to the attachment region 51. Following this temporary attachment, the operator removes the attachment/detachment jig 10 from the base member 5 (Step S1: corresponding to an example of an operation (a) of the invention). For example, as shown in FIG. 7A, the head unit 6*c* is fastened to the base member 5 by the fastening fittings 66. Note that reference signs 52 to 54 in FIG. 7A denote reference pin holes, width direction adjustment holes and rotation direction adjustment holes. These reference pin holes 52, width direction adjustment holes 53 and rotation direction adjustment holes 54 are provided adjacent to the attachment regions 51 in the base member 5 in advance. Further, a reference sign 621 denotes screw holes for attaching the contact block to the head unit 6*c*.

Figure 7B:
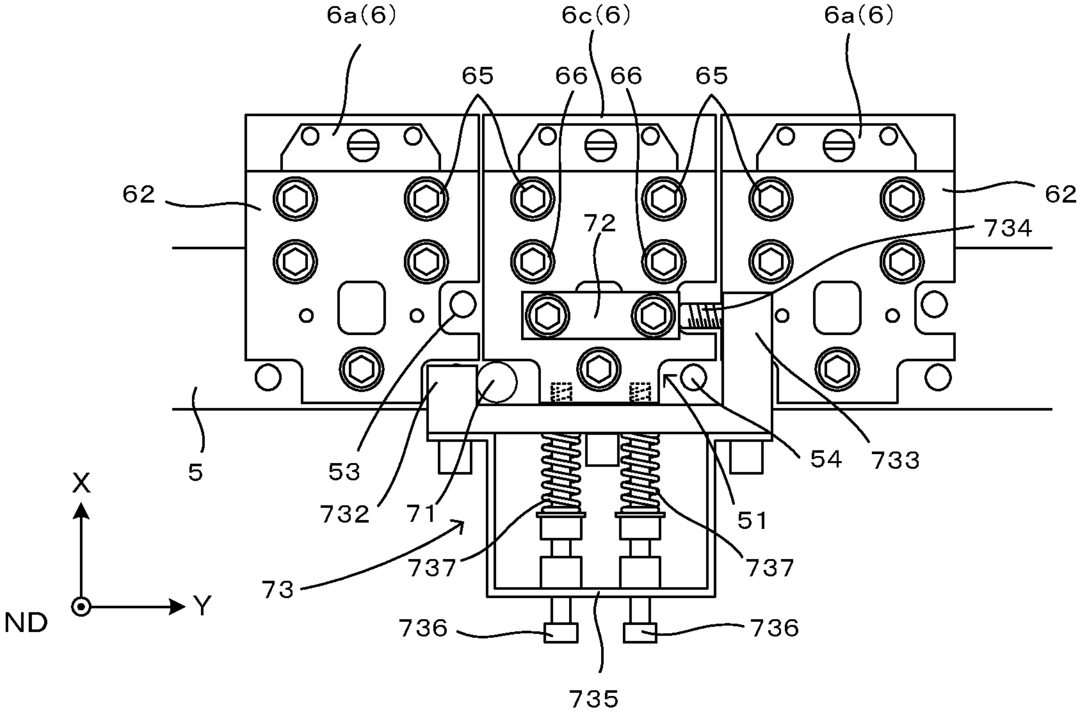

With the temporary attachment maintained, the operator mounts components (=reference pin 71, contact block 72, adjustment jig 73, width direction adjuster 74 and rotation direction adjuster 75) necessary for position adjustment (Steps S2 to S4). More particularly, as shown in FIG. 7B, the operator mounts a base end part of the reference pin 71 into the reference pin hole 52 (FIG. 7A) provided adjacent to the attachment region 51 in the base member 5. In this way, as shown in FIGS. 6 and 7B, a tip part 71*a* of the reference pin 71 stands in a surface normal direction ND of the base member 5 with respect to the base member 5 (corresponding to an example of an operation (b) of the invention). Further, the operator places the contact block 72 on the head holder 62 of the head unit 6*c*, insert fastening fittings 67 into through holes (not shown) provided in the contact block 72, and threadably engages tip parts of the fastening fittings 67 with the screw holes 621. In this way, the contact block 72 is mounted on the head unit 6*c* (Step S2).

Subsequently, the operator mounts the adjustment jig 73 on the base member 5 (Step S3: corresponding to an example of an operation (c) of the invention). This adjustment jig 73 includes a plate member 731 mountable on the base member 5 as shown in FIGS. 6 and 7B. The plate member 731 is wider than the head holder 62 in the width direction Y, and one end part 732 and another end part 733 thereof respectively partially project in the (+X) direction, i.e. toward the head unit 6. The one end part 732 extends outward (leftward of FIG. 7B) of the tip part 71*a* of the reference pin 71 and is engageable with the tip part 71*a*. The other end part 733 extends up to a position facing a widthwise end part of the contact block 72. A plunger 734 is mounted movably back and forth in the Y direction with respect to an X direction end part of the other end part 733. A tip part of this plunger 734 is facing the contact block 72. By the operation of the operator, the tip part of the plunger 734 is brought into contact with the contact block 72 and pressed by a spring (not shown) provided on the plunger 734. As just described, the adjustment jig 73 supports the head unit 6*c* movably in the width direction Y while engaging the tip part 71*a* of the reference pin 71.

Further, in the adjustment jig 73, a strip-like member 735 bent toward an opposite head unit side (lower side in FIG. 7B) of the plate member 731 is mounted on the plate member 731. Two pairs of through holes arranged in the X direction are provided in the strip-like member 735 and the plate member 731. In one pair of the through holes, screw members 736 are inserted from the opposite head unit side of the strip-like member 735 and tip parts of the screw members 736 are threadably engaged with the head holder 62 of the head unit 6*c*. A spring 737 is externally fitted on a central part of each screw member 736 to apply a biasing force to the strip-like member 735 and the plate member 731. Thus, the adjustment jig 73 supports the head unit 6*c* rotatably in the rotation direction R about the tip part 71*a* of the reference pin 71 as a center of rotation while engaging the tip part 71*a* of the reference pin 71.

Figure 7C:
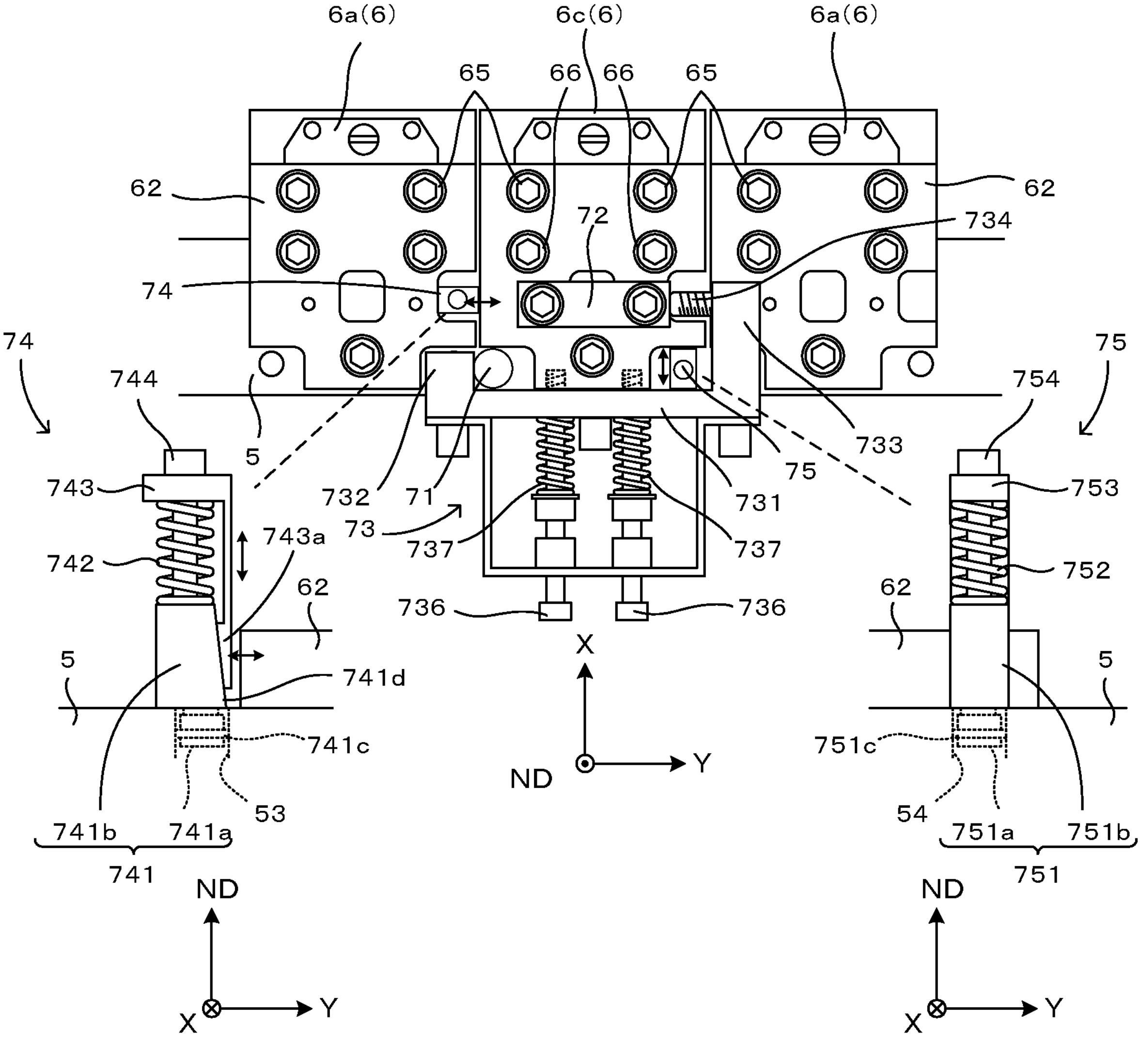

As just described, by mounting the adjustment jig 73 on the base member 5, the head unit 6*c* is biased toward the reference pin 71 (leftward in FIG. 7B) in the width direction Y and biased clockwise on the plane of FIG. 7B in the rotation direction R while engaging the tip part 71*a* of the reference pin 71. Accordingly, in this embodiment, the head unit 6*c* is made displaceable in the width direction Y against a biasing force of the plunger 734 by mounting the width direction adjuster 74 into the width direction adjustment hole 53, and made displaceable in the rotation direction R against biasing forces of the springs 737 by mounting the rotation direction adjuster 75 into the rotation direction adjustment hole 54 (Step S4: corresponding to an example of an operation (d) of the invention) as shown in FIG. 7C.

The width direction adjuster 74 and the rotation direction adjuster 75 have basically the same configuration and are different only in orientation when being respectively mounted into the width direction adjustment hole 53 and the rotation direction adjustment hole 54. Accordingly, the configuration of the width direction adjuster 74 is described on the basis of FIG. 7C here, and each part of the rotation direction adjuster 75 is denoted by a corresponding reference sign and not described.

The width direction adjuster 74 includes a fixing part 741 mountable into the width direction adjustment hole 53 provided adjacent to the attachment region 51 in the base member 5. The fixing part 741 includes a mounting part 741*a* insertable into and withdrawable from the width direction adjustment hole 53 and a standing part 741*b* standing in the surface normal direction ND from the mounting part 741*a*. A groove part (not shown) is provided in the outer side surface of the mounting part 741*a*, and an O-ring 741*c* made of an elastic material is inserted into this groove part from outside. This O-ring 741*c* has an outer diameter slightly larger than an inner diameter of the width direction adjustment hole 53. Thus, if the operator press-fits the mounting part 741*a* of the fixing part 741 into the width direction adjustment hole 53, the standing part 741*b* is firmly fixed to the base member via the O-ring 741*c* while being located between the head units 6*a* and 6*c* as shown in FIG. 7C. Further, the fixing part 741 is provided with an inclined surface 741*d*. The fixing part 741 is fixed to the base member 5 with the inclined surface 741*d* held in a posture facing the head unit 6*c*. Here, if the head unit 6*c* is brought closer to the head unit 6*a* by the biasing force of the plunger 734, a mounting operation of the width direction adjuster 74 on the base member 5 becomes cumbersome. Thus, this problem is solved by maintaining the temporary attachment as described above. Concerning this point, the same applies also to the rotation direction adjuster 75.

A coil spring 742 is arranged on an end surface in the (+ND) direction of the fixing part 741 fixed to the base member 5 in this way, and a movable part 743 is placed on an end surface in the (+ND) direction of the coil spring 742. More particularly, as shown in FIG. 7C, the movable part 743 is shaped by integrating a rectangular plate member provided to cover the coil spring 742 from a (+ND) direction side and an extending member extending from an end part of the rectangular plate member on the side of the head unit 6*c* (right side in FIG. 7C) toward the fixing part 741. The rectangular plate member is formed with a through hole having an inner diameter substantially equal to that of the coil spring 742. Then, a screw member 744 is threadably engaged with the fixing part 741 through the above through hole and the inside of the coil spring 742 from the (+ND) direction side of the movable part 743. Accordingly, if the operator rotates forward and threadably inserts the screw member 744 against a biasing force of the coil spring 742, the movable part 743 moves toward the fixing part 741. At this time, a tip part 743*a* of the extending member of the movable part 743 slides in contact with the inclined surface 741*d* of the fixing part 741 and moves toward the head holder 62 of the head unit 6*c*. Thus, this tip part 743*a* is displaced by a distance corresponding to a rotation amount of the screw member 744 and pushes the head unit 6*c* in the (+Y) direction. Conversely, if the operator reversely rotates the screw member 744, the movable part 743 is entirely moved in the (+ND) direction and the tip part 743*a* is displaced in the (−Y) direction by the biasing force of the coil spring 742.

As just described, in this embodiment, the fixing part 741, the mounting part 741*a*, the standing part 741*b*, the inclined surface 741*d*, the movable part 743 and the tip part 743*a* respectively correspond to examples of a “first fixing part”, a “first mounting part”, a “first standing part”, a “first inclined surface", a "first movable part" and a "first slide-contact part" of the invention, and a first structure including these functions as the width direction adjuster 74.

On the other hand, for the rotation direction adjuster 75, the operator press-fits a mounting part 751*a* of a fixing part 751 of the rotation direction adjuster 75 into the rotation direction adjustment hole 54 at the separation position distant from the reference pin 71 in the Y direction with an inclined surface 751*d* of the fixing part 751 facing the head unit 6*c*. In this way, as shown in FIG. 7C, the rotation direction adjuster 75 is inserted between the head unit 6*c* and the plate member 731 of the adjustment jig 73. If the operator rotates forward and threadably inserts a screw member 754 against the biasing forces of the springs 737, the movable part 753 moves toward the fixing part 751. At this time, a tip part of an extending member of the movable part 753 slides in contact with the inclined surface of the fixing part 751 and moves toward the head holder 62 of the head unit 6*c*. Thus, this tip part is displaced by a distance corresponding to a rotation amount of the screw member 754 and pushes the head unit 6*c* in the (+X) direction. As a result, the head unit 6*c* is displaced in the rotation direction R, more specifically in a counterclockwise direction in FIG. 7C, with the tip part 71*a* of the reference pin 71 as a center of rotation. Conversely, if the operator rotates the screw member 754 reversely, the entire movable part 753 is moved in the (+ND) direction by the biasing force of the coil spring 752 and the tip part 753*a* is displaced in the (−X) direction.

As just described, in this embodiment, the fixing part 751, the mounting part 751*a*, the standing part 751*b*, the inclined surface 751*d*, the movable part 753, and the tip part 753*a* of the movable part 753 respectively correspond to examples of a "second fixing part", a "second mounting part", a "second standing part", a "second inclined surface", a "second movable part" and a "second slide-contact part" of the invention, and a second structure including these functions as the rotation direction adjuster 75.

If the mounting of the width direction adjuster 74 and the rotation direction adjuster 75 is completed in this way, the operator loosens the fastening of the base member 5 and the head unit 6*c* by operating the fastening fittings 66 (Step S5). In this way, the head unit 6*c* is displaced in the (−Y) direction according to the biasing force of the plunger 734 and comes into contact with the movable part 743 of the width direction adjuster 74. That is, the head unit 6*c* is sandwiched by the plunger 734 and the width direction adjuster 74 in the width direction Y. Thereafter, by rotating the screw member 744 of the width direction adjuster 74, the head unit 6*c* can be continuously displaced in the Y direction by a distance corresponding to that rotation amount.

On the other hand, the head unit 6*c* is displaced also in the X direction and comes into contact with the rotation direction adjuster 75. That is, the head unit 6*c* is displaced in the (−X) direction according to the biasing forces of the springs 737 and comes into contact with the movable part 753 (FIG. 6). At this time, while the end part of the head unit 6*c* on the (−Y) direction side is engaging the tip part 71*a* of the reference pin 71, a biasing force in the (−X) direction acts further on the (+Y) direction side than that. By this biasing force, the head unit 6*c* rotates with the tip part 71*a* of the reference pin 71 as a center of rotation, and locked to the movable part 753 (FIG. 6) of the rotation direction adjuster 75 at the separation position distant from the reference pin 71 in the (+Y) direction. Thereafter, by rotating the screw member 754 of the rotation direction adjuster 75, the head unit 6*c* is displaced in the X direction by a distance corresponding to that rotation amount, with the result that the head unit 6*c* can be continuously displaced in the rotation direction R.

Figure 7D:
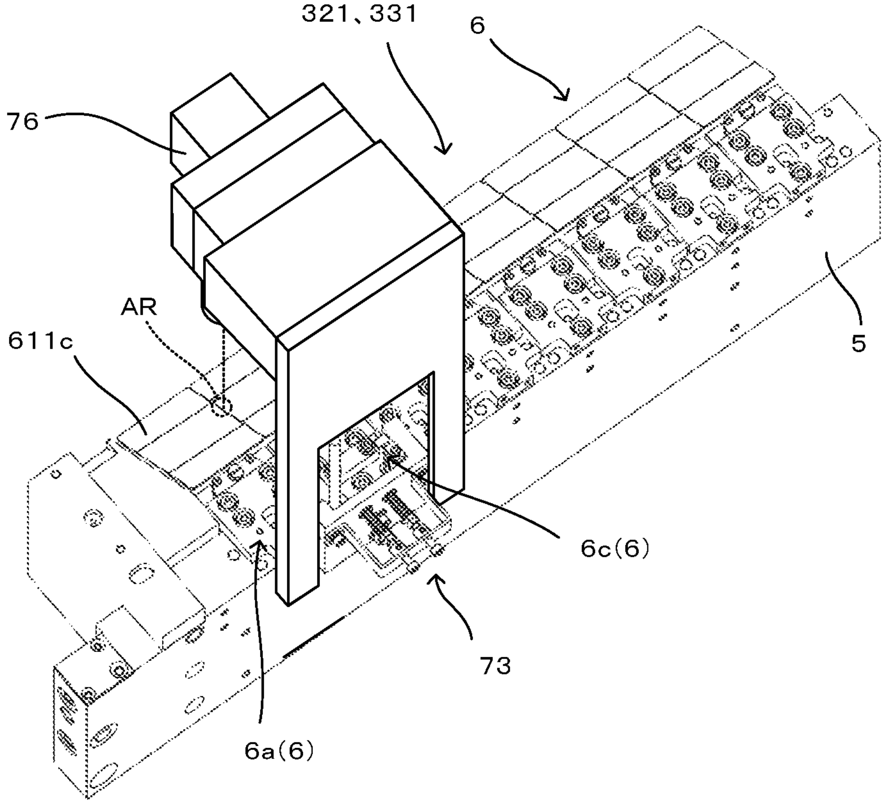

Referring back to FIG. 5, the adjustment procedure of the head unit 6*c* is further described. To adjust the head unit 6*c* with high precision, it is necessary to reliably grasp a tiny displacement of the head unit 6*c* and adjust a displacement amount with high resolution. Accordingly, in this embodiment, the operator mounts an adjustment camera 76 on the base member 5 (Step S6) as shown in FIG. 7D. An image captured by the adjustment camera 76, i.e. an image of an adjacent region AR where the head units 6*a*, 6*c* are adjacent to each other across a gap formed between the ink discharge heads 61 of the head units 6*a*, 6*c* (hereinafter, referred to as an "adjacent image"), is displayed on an unillustrated display. With reference to this adjacent image, the operator operates the screw member 744 of the width direction adjuster 74 and/or the screw member 754 of the rotation direction adjuster 75. In this way, the positions (=position in the width direction Y+ rotational position in the rotation direction R) of the head unit 6*c*, which is an object to be adjusted, mounted adjacent to the head unit 6 in the width direction Y are adjusted with high precision (Step S7: corresponding to an example of an operation (e) of the invention). If the position adjustment of the head unit 6*c* is completed, the operator firmly fastens the loosened fastening fittings 66 and completely attaches the head unit 6*c* to the base member 5 (Step S8: corresponding to an example of an operation (f) of the invention).

Thereafter, the operator performs a procedure opposite to the above one, i.e. removes the adjustment camera 76 (Step S9), removes the width direction adjuster 74 and the rotation direction adjuster 75 (Step S10), removes the adjustment jig 73 (Step S11) and removes the reference pin 71 and the contact block 72 (Step S12) in this order.

As described above, in this embodiment, the head unit 6*c* is moved in the width direction Y by the width direction adjuster 74 inserted between the head unit 6*c* as the object to be adjusted and the head unit 6*a* kept fixed to the base member 5. In this way, the gap between the head units 6*a* and 6*c* is adjusted. That is, the width direction position of the head unit 6*c* is adjusted in the width direction Y. Further, the position of the head unit 6*c* in the rotation direction R, i.e. the rotation direction position, is adjusted by moving the head unit 6*c* in the X direction by the rotation direction adjuster 75 inserted between the head unit 6*c* as the object to be adjusted and the adjustment jig 73 mounted on the base member 5 at the separation position distant from the reference pin 71 in the Y direction with the head unit 6*c* engaged with the tip part 71*a* of the reference pin 71. As a result, the position of the head unit 6*c* with respect to the head unit 6*a* can be adjusted with high precision.

Further, in this embodiment, the width direction adjuster 74 is configured to move the tip part 743*a* of the extending member of the movable part 743 while causing the tip part 743*a* to slide in contact with the inclined surface 741*d* as described above. Thus, the following functions and effects are obtained. An adjustment member, for example, such as a pin member or shim member may be used as a means for adjusting the gap between the head units 6*a* and 6*c* (comparative example). That is, a plurality of adjustment members having mutually different sizes in the Y direction may be prepared and the position of the head unit 6*c* may be adjusted by repeatedly inserting and withdrawing the adjustment members. However, this comparative example has a problem that, if outer diameters of the adjustment members have errors, this directly leads to a position adjustment error.

Further, a highly precise position adjustment is difficult due to manufacturing errors and insertion errors of the adjustment members. In contrast, in this embodiment, since a so-called wedge-shaped member is used which continuously moves the tip part 743*a* of the extending member of the movable part 743 while causing the tip part 743*a* to slide in contact with the inclined surface 741*d* as described above, a more highly precise position adjustment than the comparative example is possible. Concerning this point, the same applies also to the rotation direction adjuster 75.

Further, in the comparative example, an adjustment pattern was actually printed every time the adjustment member is exchanged, and the size of the adjustment member to be mounted next was determined based on that printing result. That is, whether or not a relative positional relationship of the head unit 6*c* with respect to the head unit 6*a* has been adjusted as designed is not directly measured, but only indirectly measured. As a result, a highly precise adjustment was difficult. In contrast, in this embodiment, the position of the head unit 6*c* is adjusted with reference to an adjacent image captured by the adjustment camera 76. That is, the above relative positional relationship is reflected in the adjacent image and directly measured. Moreover, since the position adjustment is continuously made based on that, the above relative positional relationship can be adjusted as set. As a result, high-quality printing is possible.

Further, in this embodiment, prior to the position adjustment (Step S7) of the head unit 6*c*, the reference pin 71, the contact block 72, the adjustment jig 73, the width direction adjuster 74 and the rotation direction adjuster 75 are mounted with the head unit 6*c* as the object to be adjusted temporarily attached to the base member 5 (Steps S2 to S4). Thus, the position adjustment can be smoothly prepared and the position adjustment operation can be enhanced.

As described above, in this embodiment, the head units 6*a*, 6*c* respectively correspond to examples of a "first head unit" and a "second head unit" of the invention. The X direction corresponds to an example of an "orthogonal direction" of the invention.

Note that the invention is not limited to the embodiment described above and various changes other than the aforementioned ones can be made without departing from the gist of the invention. For example, although the plunger 734 presses the head unit 6*c* as the object to be adjusted in the (−Y) direction via the contact block 72 in the above embodiment, the plunger 734 may directly press the head unit 6*c*.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

This invention can be applied to position adjustment methods in general for head units arrayed in a predetermined width direction attachably to and detachably from a base member.

What is claimed is:

1. A head unit position adjustment method for adjusting a position of a second head unit attached adjacent in a width direction to a first head unit fixed to a base member, comprising:

(a) temporarily attaching the second head unit in an attachment region adjacent to the first head unit in the width direction;

(b) causing a tip part of a reference pin to stand in a surface normal direction of the base member with respect to the base member by mounting a base end part of the reference pin into a reference pin hole provided adjacent to the attachment region in the base member;

(c) mounting an adjustment jig on the base member, the adjustment jig being configured to support the second head unit movably in the width direction and rotatably about the tip part of the reference pin as a center of rotation while engaging the tip part of the reference pin;

(d) inserting a width direction adjuster between the first head unit and the second head unit and inserting a rotation direction adjuster between the second head unit and the adjustment jig at a separation position distant from the reference pin in the width direction;

(e) adjusting a gap between the first head unit and the second head unit in the width direction by moving the second head unit in the width direction by the width direction adjuster with the temporary attachment of the second head unit loosened and adjusting a rotation direction position of the second head unit with respect to the tip part of the reference pin by moving the second head unit in an orthogonal direction orthogonal to both the width direction and the surface normal direction at the separation position by the rotation direction adjuster; and (f) fastening and completely attaching the second head unit to the base member after the completion of the operation (e).

2. The head unit position adjustment method according to claim 1, wherein the operation (d) includes:

(d-1) preparing, as the width direction adjuster, a first structure including a first fixing part and a first movable part, the first fixing part having a first mounting part mountable into a width direction adjustment hole provided adjacent to the attachment region in the base member and a first standing part standing in the surface normal direction from the first mounting part, the first movable part being coupled to the first fixing part movably in the surface normal direction while configured to slid in contact with a first inclined surface of the first standing part, the first structure being configured to displace the second head unit in the width direction by moving a first slide-contact part sliding in contact with the first inclined surface, out of the first movable part, toward the second head unit according to a movement of the first movable part in the surface normal direction with respect to the first fixing part; and (d-2) mounting the width direction adjuster such that the first movable part is located between the first head unit and the second head unit.

3. The head unit position adjustment method according to claim 2, wherein the operation (e) includes:

(e-1) adjusting the gap by continuously moving the second head unit in the width direction by a movement of the first slide-contact part.

4. The head unit position adjustment method according to claim 1, wherein the operation (d) includes:

(d-3) preparing, as the rotation direction adjuster, a second structure including a second fixing part and a second movable part, the second fixing part having a second mounting part mountable into a rotation direction adjustment hole provided adjacent to the attachment region in the base member and a second standing part standing in the surface normal direction from the second mounting part, the second movable part being coupled to the second fixing part movably in the surface normal direction while configured to slid in contact with a second inclined surface of the second standing part, the second structure being configured to displace the second head unit in the rotation direction by moving a second slide-contact part sliding in contact with the second inclined surface, out of the second movable part, toward the second head unit according to a movement of the second movable part in the surface normal direction with respect to the second fixing part; and (d-4) mounting the rotation direction adjuster such that the second movable part is located between the second head unit and the adjustment jig.

5. The head unit position adjustment method according to claim 4, wherein the operation (e) includes:

(e-2) adjusting the rotational position by continuously moving the second head unit in the orthogonal direction by a movement of the second movable part.

6. The head unit position adjustment method according to claim 1, wherein:

the operation (e) is a step of adjusting the gap and the rotational position based on an adjacent image while obtaining the adjacent image, the first head unit and the second head unit being adjacent across the gap in the adjacent image.

* * * * *